April 20, 1971    J. D. DEMPSEY    3,575,805

NUCLEAR REACTOR CONTROL ROD DRIVE ASSEMBLY

Filed Dec. 18, 1968

INVENTOR.
JOHN D. DEMPSEY
BY

United States Patent Office 3,575,805
Patented Apr. 20, 1971

3,575,805
NUCLEAR REACTOR CONTROL ROD DRIVE ASSEMBLY
John D. Dempsey, Lynchburg, Va., assignor to the United States of America as represented by the United States Atomic Energy Commission
Filed Dec. 18, 1968, Ser. No. 784,679
Int. Cl. F16h 37/06; G21c 7/08
U.S. Cl. 176—36      3 Claims

ABSTRACT OF THE DISCLOSURE

A control rod drive assembly for a nuclear reactor utilizing a planetary gear system and a pair of motor drive units in continuous operation. Speed adjustments of one motor unit causes control rod movement for purpose of reactor control. Braking of said motor unit provides rapid rod insertion while a flywheel built into the planetary gear system provides rapid rod insertion in the event both motor units fail.

BACKGROUND OF THE INVENTION

The invention described herein was made in the course of, or under a contract with the U.S. Atomic Energy Commission.

The reactivity control system of a nuclear reactor relying on the use of control rods must be capable in addition to its normal control function of reacting rapidly to conditions requiring a reactor shutdown while at the same time being capable of sustaining any single malfunction.

In general, these goals are accomplished by utilizing more than one independent drive system for each control rod while at the same time providing for a fail safe arrangement to scram the reactor in the event of a power failure. This may be accomplished by using gravity scram arrangements in combination with a power storage system such as a spring or gas under pressure to provide a positive scram in the event of power failure.

These arrangements while generally successful and functional require elaborate mechanisms which are expensive and themselves are subject at all times to the possibility of failure due to their complexity.

SUMMARY OF THE INVENTION

This invention overcomes the disadvantages of present control rod drive mechanisms by providing a simplified and reliable construction capable of close and accurate control during normal operation while providing rapid and positive control rod insertion when rapid shutdown of the reactor is required. In addition, greater economies in the construction and maintenance of the control drive mechanism are obtained by virtue of the simplified and less elaborate arrangement which is the result of this invention.

It is thus a principal object of this invention to provide a control rod drive mechanism with improved reliability and control characteristics and greater economy in manufacture and maintenance.

Other objects and advantages of this invention will hereinafter become more evident from the following description of a preferred embodiment of this invention given with reference to the accompanying drawing.

DESCRIPTION OF THE PREFERRED EMBODIMENT

Figure 1:
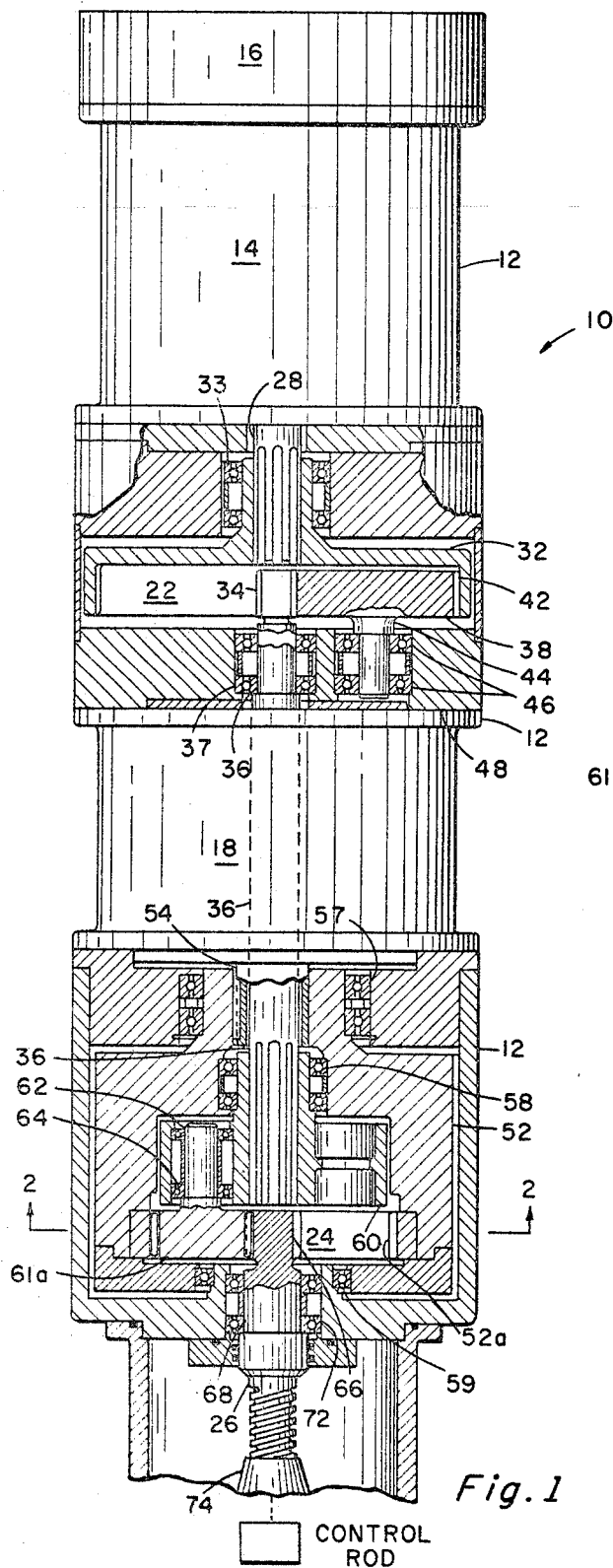
FIG. 1 is an elevation view in section of a preferred embodiment of this invention.
Figure 2:
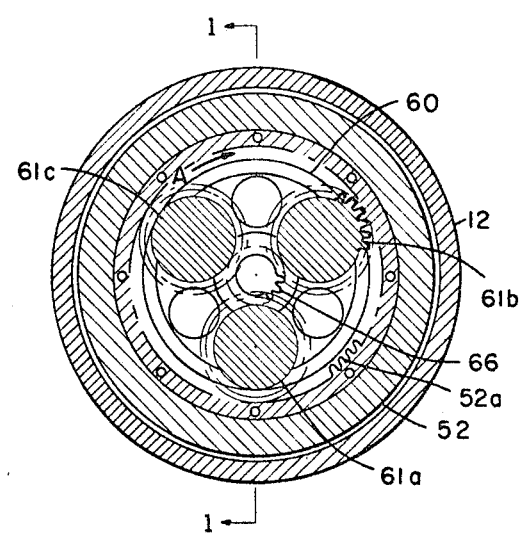
FIG. 2 is a view along 2—2 of FIG. 1, rotated 90°.

Referring to FIGS. 1 and 2, control rod drive assembly 10 consists of a housing 12 enclosing a primary drive motor 14 having a brake 16, a secondary drive motor 18, a gear system 22, and planetary gear system 24. A ball screw 26 extends from planetary gear system 24 and housing 12 as shown.

Motor assembly 14 incorporates a three speed synchronous motor which as understood in the art is capable of very small step changes at low speeds. This is a function of line frequency and the number of poles, such that speed is proportional to the square of the frequency and inversely proportional to the number of poles. By switching stator poles close control can be exercised over the speed of motor assembly 14. A typical synchronous motor for this application would be one having the three speeds of 29.752, 30.000 and 30.252 r.p.m.

Brake 16 is described as a cold type brake by which is meant that it is held normally disengaged by the same electrical source that operates the motor and automatically engages when the power source fails. Brake 16 when engaged physically grabs and prevents rotation of shaft 28 extending from motor assembly 14. The details of the actual braking (not shown) are conventional and do not form a part of this invention.

Mounted integrally on shaft 28 is a ring gear 32 in gear assembly 22, supported for rotation by bearing 33. Pinion gear 34 is mounted on the end of shaft 36 which extends through motor assembly 18 into planetary gear assembly 24. Shaft 36 is not, in its passage through motor assembly 18, interconnected at this point with the latter. Shaft 36 is supported near its upper end on bearing 37.

Referring back to planetary gear assembly 22, idler gears 38, which may number three, are mounted as understood in the art for engagement with pinion gear 34 and internal gear teeth 42 on ring gear 32.

Idler gear 38 is mounted on a shaft 44 which is supported by bearings 46 mounted in stationary wall 48.

In planetary gear assembly 24, a fly wheel ring gear 52 with gear teeth 52a is mounted on a hollow shaft 54 which extends into motor assembly 18 for drive. Secondary motor assembly 18 contains a suitable constant speed synchronous motor with a typical speed of rotation being 360 r.p.m. Hollow shaft 54 and ring gear 52 are mounted for rotation together integrally free of shaft 36 on bearings 57, 58 and 59. Fly wheel ring gear 52 is massive relative to ring gear 32 storing sufficient energy for a rapid scram in the event that the secondary motor assembly 18 fails.

Mounted on shaft 36 is a prime driver carrier 60 which supports three planet gears 61a, 61b, and 61c, as shown in FIG. 2 engaged with internal teeth 53a of ring gear 52. Gear 61a is attached to a shaft 62 supported in bearings 64 in carrier 60. The other planet gears are similarly supported for rotation. Sun gear 66 is mounted on the end of shaft 68 which extends to and is a part of ball screw 26. Shaft 68 is supported for rotation on bearings 72.

In the operation of the apparatus just described, both primary and secondary motor drive assemblies 14 and 18, respectively, are running continuously. They are both linked to ball screw 26 without the use of clutches or other mechanical disconnects, as already described. With primary drive assembly 14 operating at 30 r.p.m. and a gear ratio of 10:1 in gear assembly 22, pinion gear 34 and hence prime drive carrier 60 is rotating at 300 r.p.m., in a clockwise direction shown by arrow A in FIG. 2, by way of example. With secondary drive assembly 18 and hence fly wheel ring gear 52 rotating at 360 r.p.m. in the same direction, clockwise, it is possible to determine the conditions under which sun gear 66 and thus ball screw 26 will remain stationary. The purpose of gear assembly 22 employing an internal toothed ring gear, a fixed idler, and a pinion is to adjust the speeds obtainable from synchronous motors operating from a common line frequency, e.g. 60 c.p.s., to a particular reaction shim speed parameter. Assembly 22 could be modified or eliminated entirely if the required shim speeds could be obtained directly from planetary gear system 24.

With reference to planetary system 24

(1) $$F = 1 - \left[(S-1)\frac{Z}{B}\right]$$

where

F=revolutions of sun gear 55 per revolution of prime drive carrier 60.
S=revolutions of ring gear 52 per revolution of prime drive carrier 60.
Z=number of teeth 52a on ring gear 52.
B=number of teeth on sun gear 66.

If the ratio $$\frac{Z}{B} = \frac{150}{30} = 5, \text{ and } F = 0$$

then (2) $$0 = 1 - [(S-1)]$$
(3) $$S = 1.2$$

Thus it is seen with the gear ratios properly selected for gear system 22 and planetary system 24, primary motor assembly 14 operating at 30 r.p.m. and secondary motor assembly 18 operation at 360 r.p.m., ball screw 26 and thus the ball nut 74 to which is connected the control rod is absolutely stationary.

When it is desired to withdraw (raise the control rod, that is, rotate sun gear 66 counter-clockwise and raise ball nut 74, primary drive assembly 14 is increased in speed to 30.252 r.p.m. and sun gear 66 will rotate 0.05 revolution for each revolution of prime drive carrier 60 in the direction indicated. To lower the control rod, a change in speed of primary drive assembly 14 to 29.752 r.p.m. will produce the opposite effect.

Synchronous motors are literally "in time" with the power supply, their average speed being directly proportional to the line fresuency and inversely proportional to the number of poles.

Speed changes can be accomplished by shifting the number of poles in the stator which act upon the rotor of the primary three speed motor. This can also be accomplished by having three independent sets of stator poles acting upon a common rotor. This assures the value of "S" above which will remain as desired regardless of variations expected to occur in line frequency. The three motor speeds described in the preferred embodiment are true synchronous speeds based on varying the number of poles in the stator, acting upon the rotor, with a 60 c.p.s. line frequency rather than adjusting motor speed with frequency changes. The three speeds and corresponding number of poles follow:

Where (4) $$\text{r.p.m.} = \frac{\text{frequency}^2}{\frac{1}{2} \text{ number of poles}}$$

then (5) $$\frac{60^2}{.5 \times 238} = 30.252 \text{ r.p.m.}$$

and (6) $$\frac{60^2}{.5 \times 240} = 30 \text{ r.p.m.}$$

and (7) $$\frac{60^2}{.5 \times 242} = 29.752 \text{ r.p.m.}$$

Although the three synchronous speeds are given as absolute for descriptive purposes, it would be noted that the device requires only relative speed control.

Since both the primary and secondary motors are driven from a common line frequency, their relative speeds which determine the value "S" will remain as desired regardless of variations in power frequency. The ratio "S" is determined by disregarding line frequency with the expression S=number of poles primary motor divided by number of poles secondary motor×10 (the 10 factor results from the increased gear train). In the preferred embodiment then for a rod motionless condition, (8) $$S = \frac{240 \text{ poles}}{20 \text{ poles} \times 10} = 1.2$$

thus "F"=zero.

The desired speed rates are thus achieved regardless of variations in power line frequency. It is very difficult to achieve this degree of accuracy with other speed adjusting devices, such as frequency controls, which would require absolute rather than relative motor speeds. Thus it is seen that in this invention drive output ratios are determined by relative motion of the two input motors based on a specific number of poles with a common power frequency, rather than adjusting the motor speeds with individual frequency controls.

It will be noted thus that during normal operation of this apparatus, there are three speed selections available, namely, slow counter clockwise, slow clockwise, or zero rotation of ball screw 26. However, the arrangement just described is capable of producing a rapid counter clockwise rotation of ball screw 26 causing rapid insertion of the control rod (i.e., ball nut 74) when a scram or other emergency insertion is required. By cutting off power to cold brake 16, shaft 36 and prime drive carrier 60 are locked against rotation. With the prime driver cage restrained from rotating, there is a five-to-one speed increase for a rapid shutdown, or scram. In the event of a power failure which causes actuation of cold brake 16 and failure of the secondary motor assembly, the energy stored in fly wheel ring gear 52 is sufficient to carry out the rapid shutdown. In addition, as understood in the art, under certain conditions the control rod attached to ball nut 74 would fall as a result of gravity alone.

It should be noted that while a large mass is required for the flywheel effect in the secondary drive arrangement, the rotating mass of the prime driver 32 should be held as low as possible to permit rapid adjustment of the position of the control rod.

It is thus seen that there has been provided a control rod drive arrangement providing precise and rapid control for normal reactor operation and rapid insertion in the event of any kind of a failure within or out of the control drive arrangement. The arrangement has improved reliability, simplicity, and response rate, and is independent of variations in power supply frequency.

While only a preferred embodiment has been described it is understood that variations thereof are possible within the scope of this invention as defined in the accompanying claims.

I claim:
1. A nuclear reactor control rod drive assembly in which a control rod is moveable in an insertion direction and a withdrawal direction the improvement comprising:
   (a) primary motor means for delivering a variable drive speed;
   (b) primary transmission means for delivering the output of said primary motor means;
   (c) secondary motor means for delivering a constant drive speed;
   (d) secondary transmission means for receiving drive from said secondary motor means and said primary transmission means and delivering to said control rod a differential output whose direction of output and rate is a function of the relative inputs thereto, the drives from said primary and secondary motor means being in the directions of control rod withdrawal and insertion, respectively, adjustment of the speed of said primary motor means determining the direction and rate of said differential output; and (e) braking means to stop rotation of said primary motor means and thereby cause the output of said secondary transmission means to be rapid in the direction of inserting said control rod.

2. The drive assembly of claim 1 in which said secondary transmission means has a ring gear connected to receive the output of said secondary motor means, said ring gear being relatively massive to function as a flywheel, thereby acting in the direction of inserting said control rod when both said primary and secondary motor means fail to function.

3. The drive assembly of claim 2 in which said secondary transmission means is a planetary gear assembly.

References Cited

UNITED STATES PATENTS

| | | | |
|---|---|---|---|
| 3,152,960 | 10/1964 | Alfred | 176—36 |
| 1,909,801 | 5/1933 | Basart | 74—675 |
| 2,436,936 | 3/1948 | Page | 74—675X |
| 2,998,538 | 8/1961 | O'Mahoney | 74—675X |
| 3,161,083 | 12/1964 | Roe | 74—675 |
| 3,358,529 | 12/1967 | Van den Kieboom | 74—675 |

ARTHUR T. McKEON, Primary Examiner

U.S. Cl. X.R.

74—675